(12) United States Patent
Argumedo et al.

(10) Patent No.: US 7,325,763 B1
(45) Date of Patent: Feb. 5, 2008

(54) MAGNETIC TAPE GUIDING SYSTEM GUIDE ROLLER WITH SINGLE FLANGE ORIENTED AT LOWER DEBRIS TAPE EDGE

(75) Inventors: Armando Jesus Argumedo, Tucson, AZ (US); Kevin Bruce Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/534,203

(22) Filed: Sep. 21, 2006

(51) Int. Cl.
*G03B 23/02* (2006.01)
(52) U.S. Cl. .................. 242/346.2; 242/615.2
(58) Field of Classification Search ............ 242/332.4, 242/346.2, 615.2, 548, 548.2
See application file for complete search history.

(56) References Cited

U.S. PATENT DOCUMENTS

| | | | |
|---|---|---|---|
| 3,113,742 A | 12/1963 | Bevan et al. | |
| 3,800,314 A * | 3/1974 | Sato | |
| 3,856,229 A | 12/1974 | Byram | |
| 4,004,752 A | 1/1977 | Kamaya | |
| 4,011,587 A | 3/1977 | Arter et al. .................. 360/62 |
| 4,074,329 A * | 2/1978 | Sakumoto et al. | |
| 4,740,856 A | 4/1988 | Yoshii et al. ................ 360/132 |
| 5,160,078 A | 11/1992 | Spicer ......................... 226/190 |
| 5,398,881 A | 3/1995 | Krantz et al. ................ 242/347 |
| 5,417,379 A | 5/1995 | Gelardi et al. ............... 242/347 |
| 5,454,501 A | 10/1995 | Konno et al. ................ 226/190 |
| 5,769,357 A * | 6/1998 | Kwon ...................... 242/615.2 |
| 7,172,149 B1 * | 2/2007 | Rudi et al. ................ 242/332.4 |

FOREIGN PATENT DOCUMENTS

JP          5-151663       * 6/1993

* cited by examiner

*Primary Examiner*—William A Rivera
(74) *Attorney, Agent, or Firm*—John H. Holcombe

(57) ABSTRACT

Magnetic tape guiding system takes advantage of characteristics of slit magnetic tape wherein one of the two tape edges has a higher tendency to shed tape debris than the other, and the slit tape is consistently loaded into tape cartridges in the same direction. A tape guiding system is configured to guide a magnetic tape along a tape path extending across magnetic tape head(s) from a tape cartridge oriented in a single direction, the cartridge having a length of magnetic tape with a second edge tending to create lower debris under contact than a first edge. At least one single flange tape guide roller has a cylindrical surface oriented to provide the tape path for the magnetic tape, and has a single flange at one end of the cylindrical surface that is oriented with respect to the cartridge receiver to correspond to the second edge of the magnetic tape.

9 Claims, 4 Drawing Sheets

MAGNETIC TAPE GUIDING SYSTEM GUIDE ROLLER WITH SINGLE FLANGE ORIENTED AT LOWER DEBRIS TAPE EDGE

FIELD OF THE INVENTION

This invention relates to guiding magnetic tape, and, more particularly, to guiding magnetic tape longitudinally with respect to at least one magnetic tape head configured to read and/or write data with respect to the magnetic tape.

BACKGROUND OF THE INVENTION

Magnetic tape configured to be employed for magnetic recording is typically formed into lengths by slitting a much wider web of tape into thin strips, such as "half-inch" magnetic tape. A length of the slit magnetic tape is typically wound onto one or two reels of a magnetic tape cartridge.

The slitting process typically comprises a shear cut process similar to the cutting action that is used with a pair of scissors, and typically employs pairs of rotating blades, one of the pair of either side of the web. Slitting parameters which may affect the quality of the slit edge may include: web feed speed, rotating blade speed, sharpness of the rotating blades, uniformity of blade sharpness, angle of convergence of the pair of rotating blades, properties of the web material, and axial tension of the web.

Care is taken in the slitting process to make sure that the slit magnetic tape is not damaged. Undamaged magnetic tape typically still produces debris under edge contact, for example, when the edge contacts a flange.

Flanged guide rollers are used in a tape path to constrain the tape laterally. Especially in "half-inch" magnetic tape drives, which typically write and read digital data, the flanged guide rollers limit the "LTM" (lateral tape motion) of magnetic tape to levels that allow adequate track following by a servoed tape head and to limit the skew of the magnetic tape as it passes over the tape head.

SUMMARY OF THE INVENTION

Magnetic tape drives, tape guiding systems and magnetic tape recording paths are provided for guiding magnetic tape from a magnetic tape cartridge. A characteristic of slit magnetic tape is that one of the two tape edges has a higher tendency to shed tape debris than the other, due to the fabrication process. The slit magnetic tape is consistently loaded into magnetic tape cartridges in the same direction in the manufacturing process, such that the length of magnetic tape in a cartridge has respectively first and second parallel edges at opposite sides of the magnetic tape, the second edge tending to create lower debris under contact than the first edge.

An embodiment of a magnetic tape drive in accordance with the present invention comprises a cartridge receiver configured to receive a magnetic tape cartridge oriented in a single direction, the magnetic tape cartridge having a length of magnetic tape with respectively first and second parallel edges at opposite sides of the magnetic tape, the second edge tending to create lower debris under contact than the first edge; at least one magnetic tape head configured to read and/or write data with respect to magnetic tape guided across the magnetic tape head; at least one single flange tape guide roller having a cylindrical surface oriented to provide a tape path for the magnetic tape across the magnetic tape head(s), and having a single flange at one end of the cylindrical surface that is oriented with respect to the cartridge receiver to correspond to the second edge of the magnetic tape; and a tape drive system configured to move the magnetic tape longitudinally along the tape path.

In a further embodiment, the magnetic tape drive comprises at least one single flange tape guide roller at either side of the magnetic tape head(s) along the tape path.

In a still further embodiment, the tape drive system of the magnetic tape drive is configured to respectively wind and unwind magnetic tape longitudinally along the tape path to and from reels at either side of the magnetic tape head(s), and wherein the single flange tape guide rollers are positioned at points along the tape path where the tape path is directed towards the reels.

In another embodiment, a tape guiding system is configured to guide a magnetic tape along a tape path, the tape path extending across at least one magnetic tape head from a magnetic tape cartridge oriented in a single direction, the magnetic tape cartridge having a length of magnetic tape with respectively first and second parallel edges at opposite sides of the magnetic tape, the second edge tending to create lower debris under contact than the first edge; the tape guiding system comprising at least one single flange tape guide roller having a cylindrical surface oriented to provide a tape path for the magnetic tape across the magnetic tape head(s), and having a single flange at one end of the cylindrical surface that is oriented with respect to the cartridge receiver to correspond to the second edge of the magnetic tape.

In still another embodiment, a magnetic tape recording path is configured to record data with respect to a magnetic tape guided longitudinally along a tape path, the tape path extending from a magnetic tape cartridge oriented in a single direction, the magnetic tape cartridge having a length of magnetic tape with respectively first and second parallel edges at opposite sides of the magnetic tape, the second edge tending to create lower debris under contact than the first edge. The magnetic tape recording path comprises at least one magnetic tape head configured to read and/or write data with respect to magnetic tape guided across the magnetic tape head; and at least one flange tape guide roller having a cylindrical surface oriented to provide a tape path for the magnetic tape longitudinally across the at least one magnetic tape head, and having a single flange at one end of the cylindrical surface that is oriented with respect to the cartridge receiver to correspond to the second edge of the magnetic tape.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
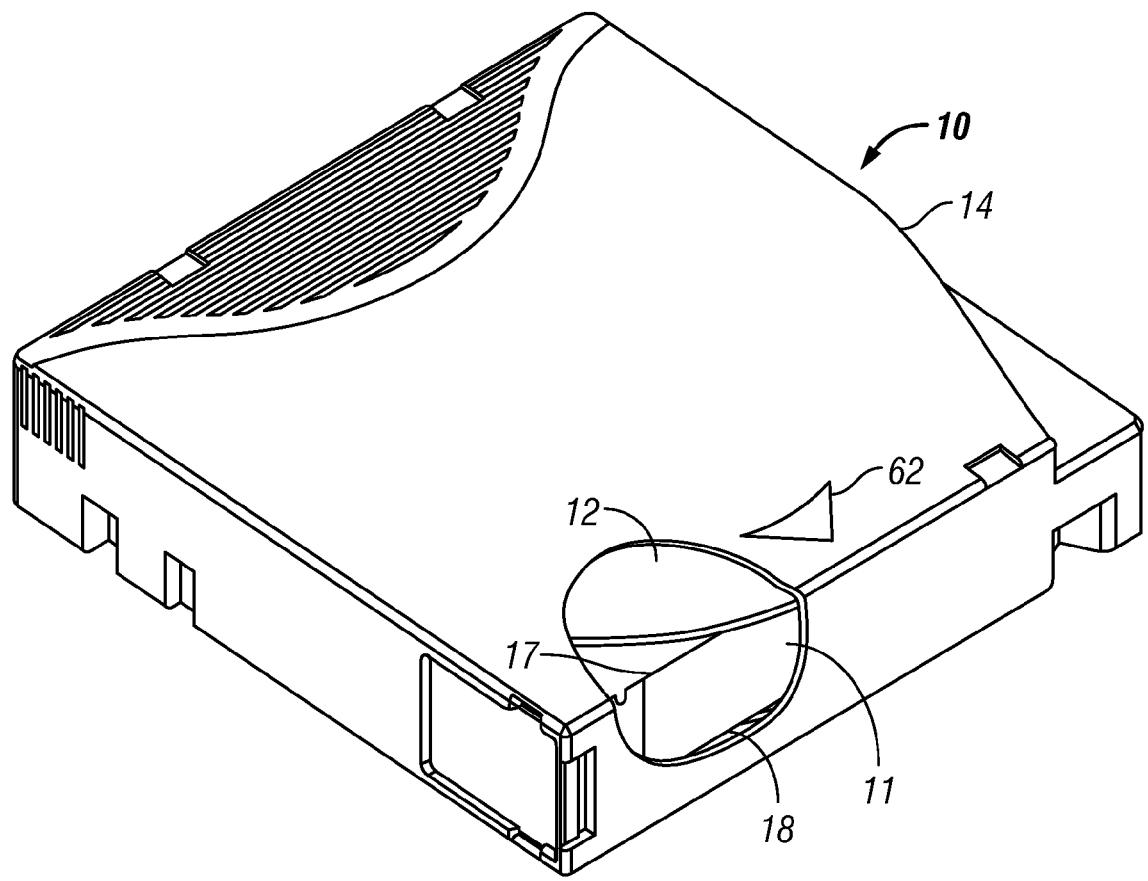
FIG. 1 is a partially cut away illustration of a prior art magnetic tape cartridge.

Referring to FIG. 1, a prior art magnetic tape cartridge 10 is illustrated having a length of magnetic tape 11 wound on a tape supply reel 12. The tape supply reel 12 is mounted in a cartridge shell 14, and may be rotated by a tape drive system of a magnetic tape drive to wind the magnetic tape 11 on or to unwind the magnetic tape from the reel 12.

Magnetic tape configured to be employed for magnetic recording is typically formed into lengths by slitting a much wider web of tape into thin strips, such as "half-inch" magnetic tape. A length of slit magnetic tape is typically would onto one or two reels of a magnetic tape cartridge.

The slitting process typically comprises a shear cut process similar to the cutting action that is used with a pair of scissors, and typically employs pairs of rotating blades, one of the pair on either side of the web. Slitting parameters which may affect the quality of the slit edge may include: web feed speed, rotating blade speed, sharpness of the rotating blades, uniformity of blade sharpness, angle of convergence of the pair of rotating blades, properties of the web material, and axial tension of the web.

Care is taken in the slitting process to make sure that the slit magnetic tape is not damaged. Undamaged magnetic tape typically still produces debris under edge contact, for example, when the edge contacts a flange.

Flanged guide rollers are used in a tape path to constrain the tape laterally. Especially in "half-inch" magnetic tape drives, which typically write and read digital data, the flanged guide rollers limit the "LTM" (lateral tape motion) of magnetic tape to levels that allow adequate track following by a servoed tape head and to limit the skew of the magnetic tape as it passes over the tape head.

The act of limiting LTM causes tape to flange contact, which may create tape debris through contact-wear processes. The shed tape debris can result in formation of densely packed regions of this debris, which collects on the roller's flange. Once formed, these packed debris regions (along the circumference of the roller on the flange surface) will act to disturb the otherwise unperturbed lateral motion of the tape as it passes through the roller. The perturbed tape is known to move laterally fast enough to defeat the action of the track following servo. The result is failure to allow data transfer from the head to the tape.

Elimination of the flanges of guide rollers in the tape path to counter the formation of the tape debris also eliminates limits to LTM which can render the tape path non-functional for some drive's operating point. The LTM limits become the flanges of the tape supply reel 12 in the tape cartridge 10, and the tape drive's take up reel flanges. Typically, these flanges require much more clearance between their inner surfaces and the tape edges. This is due to much larger cartridge reel fabrication tolerances (relative to tape guide rollers) as well as large uncertainty in the placement of the tape cartridge reel 12 onto the driving motor interface mechanism. The fear of tape edge contact with the reel flanges is that such contact can result in large and fast LTM and/or create damage to the tape. Therefore, reel flange to tape edge clearance is kept to a relatively large value.

Extreme LTM produced in a flangeless tape guide may also allow the tape to be skewed as it passes over the tape head. A skewed tape can result in writing data bits onto the tape in an undesirable orientation relative to the straight edge of the tape.

A characteristic of slit "half inch" magnetic tape is that one of the two tape edges has a higher tendency to shed tape debris than the other, due to the fabrication process. The characteristic of the magnetic tape is exposed when the tape passes through a flanged roller tape path. The flanged roller, during its attempts to constrain the tape laterally, works the characteristically "weak" tape edge to the point where that edge "gives up" by shedding debris (that is, the tape edge produces debris that can then adhere to the tape guide flanges, as discussed above).

A further characteristic of the tape media is that, due to the fabrication process sequence, the slit magnetic tape is consistently loaded into magnetic tape cartridges in the same direction, such that the length of magnetic tape in a cartridge has respectively first and second parallel edges at opposite sides of the magnetic tape, the first edge comprising the "weak" edge, and the second edge tending to create lower debris under contact than the first edge. For example, in the magnetic tape cartridge 10, tape edge 17 is consistently the "weak" edge, and tape edge 18 is consistently the edge tending to create lower debris.

Figure 2:
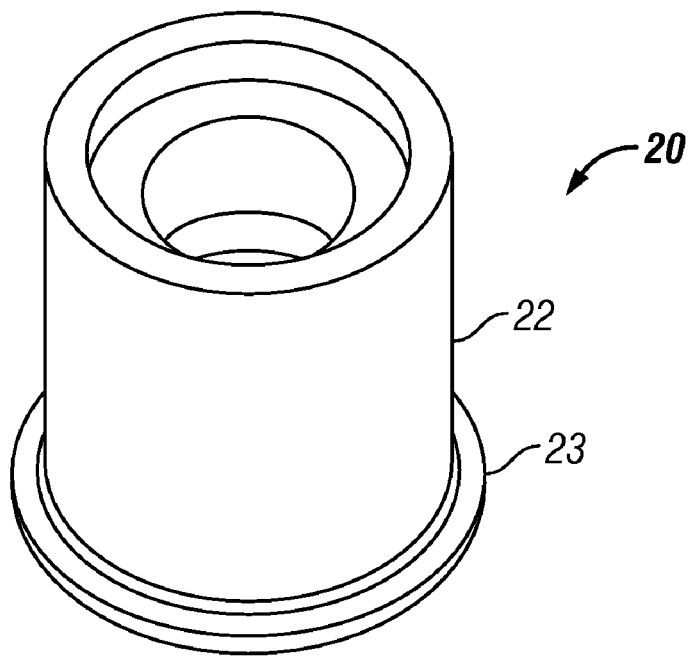
FIG. 2 is a diagrammatic illustration of a single flange tape guide roller in accordance with the present invention.

Referring to FIG. 2, in accordance with the present invention, a single flange tape guide roller 20 is illustrated having a cylindrical surface 22 oriented to provide a tape path for a magnetic tape, such as magnetic tape 11 of FIG. 1, and having a single flange 23 at one end of the cylindrical surface that is oriented with respect to the magnetic tape of the tape cartridge 10 of FIG. 1 to correspond to the second edge 18 of the magnetic tape. The single flange tape guide roller eliminates a problematic top flange which corresponds to the first edge 17 of the magnetic tape of FIG. 1, and provides the bottom flange 23. The result is that the performance impact created by tape debris on the top flange is eliminated and the LTM and tape skew performance is constrained to a level of approximately half that of a flangeless guide roller, thus allowing functional operation where a "fully flangeless" tape path would not.

Figure 3:
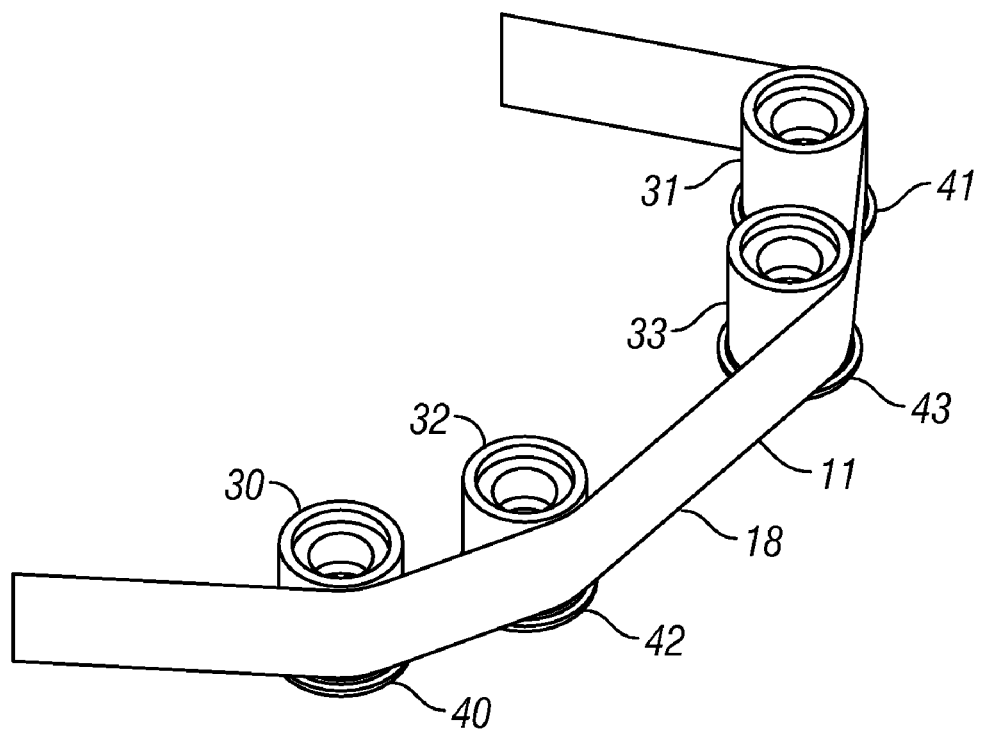
FIG. 3 is a diagrammatic illustration of a plurality of single flange tape guide rollers of FIG. 2 forming a tape path.

FIG. 3 illustrates a tape path employing a plurality of single flange tape guide rollers 30, 31, 32, and 33, such as tape guide roller 20 of FIG. 2, configured to guide a magnetic tape 11 along its tape path. The single flanges 40, 41, 42 and 43 each is at an end of the roller that is oriented with respect to the magnetic tape 11 of the tape cartridge 10 of FIG. 1 to correspond to the second edge 18 of the magnetic tape.

Figure 4:
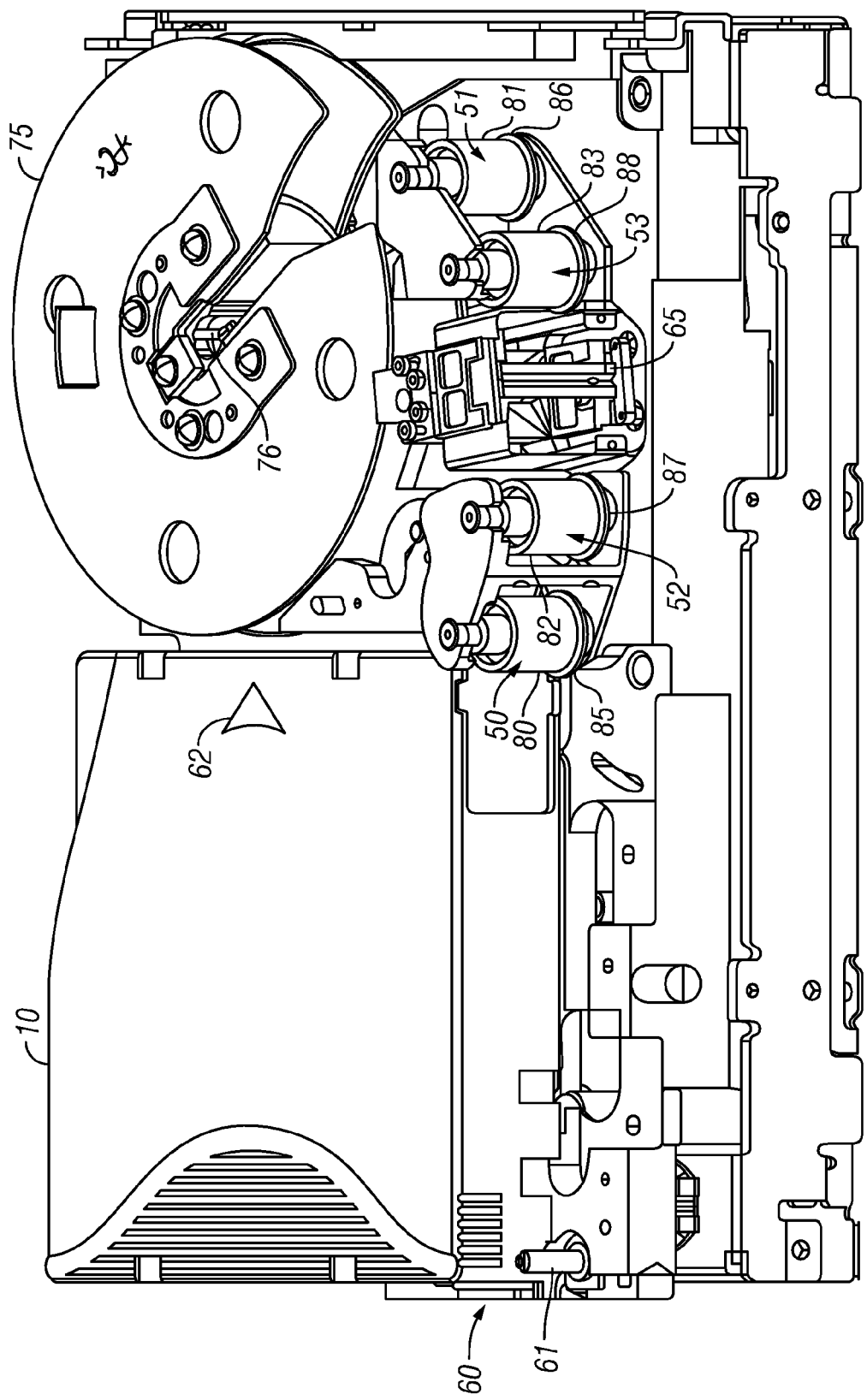
FIG. 4 is a diagrammatic illustration of a magnetic tape drive employing single flange tape guides of FIG. 2.
Figure 5:
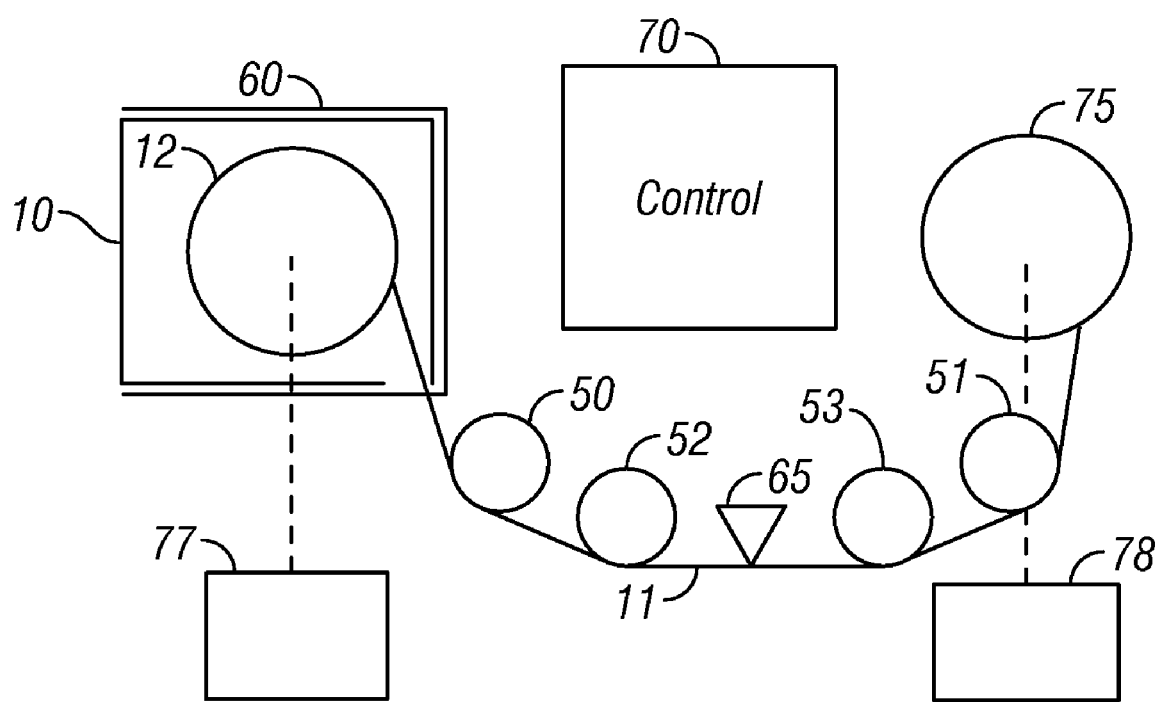
FIG. 5 is a block diagram illustrating the magnetic tape drive of FIG. 4.

A magnetic tape drive is illustrated in FIGS. 4 and 5 comprising an arrangement of single flange tape guide rollers 50, 51, 52 and 53, such as tape guide roller 20 of FIG. 2, configured to guide a magnetic tape 11 from tape cartridge 10 of FIG. 1 along a tape path formed by the tape guide rollers.

A cartridge receiver 60 is configured to receive a magnetic tape cartridge 10 oriented in a single direction, and to align the magnetic tape cartridge, for example, with guide pin 61, with respect to the cartridge receiver. As discussed above, the magnetic tape cartridge 10 has a length of magnetic tape 11 with respectively first and second parallel edges at opposite sides of the magnetic tape, the second edge tending to create lower debris under contact than the first edge. The cartridge receiver 60 is configured to allow insertion of a magnetic tape cartridge 10 with only a single orientation. The proper orientation may be illustrated on the cartridge itself, for example, by arrow 62 on the shell 14 (FIG. 1) of the cartridge. The proper orientation may be enforced by the specific shape of the cartridge or by means of various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 10 to a take up reel 75, for example, positioning the free end leader block at the central axis 76 of the take up reel. The magnetic tape is thus positioned along the tape path.

A magnetic tape head (or heads) 65 is configured to read and/or write data with respect to magnetic tape guided across the magnetic tape head. Suitable control 70 is configured to, inter alia, provide the lateral servoing of the magnetic tape head and to provide the write and read capability to the magnetic tape head 65, as is known to those of skill in the art.

A tape drive system comprising control 70, take up reel 75 and drive motors 77 and 78 is configured to operate supply reel 12 of the tape cartridge 10 and to operate take up reel 75 to move the magnetic tape 11 longitudinally along the tape path.

In the illustrated embodiment, single flange tape guide rollers 50, 51, 52 and 53 each has a cylindrical surface 80, 81, 82, 83 oriented to provide a tape path for the magnetic tape 11 across the magnetic tape head(s) 65, and each has a single flange 85, 86, 87, 88 at one end of the cylindrical surface 80, 81, 82, 83 that is oriented with respect to the cartridge receiver 60 to correspond to the second edge of the magnetic tape 11.

The tape path comprises at least one single flange tape guide roller 50 positioned between the magnetic tape cartridge 10 and magnetic tape head 65, and may comprise at least one single flange tape guide roller 50, 51 at either side of the magnetic tape head 65. Additional tape guide rollers or other types of guides may be provided depending on the length and/or complexity of the tape path, and preferably comprise single flange tape guide rollers, such as tape guide rollers 52 and 53.

Referring to FIG. 2, the single flange tape guide rollers 20 may be made initially to have only a single flange, or alternatively may be made from tape guide rollers initially having two flanges and removing the top flange.

Those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic tape drive comprising:
a cartridge receiver configured to receive a magnetic tape cartridge oriented in a single direction, said magnetic tape cartridge having a length of magnetic tape with respectively first and second parallel edges at opposite sides of said magnetic tape, said second edge tending to create lower debris under contact than said first edge;
at least one magnetic tape head configured to read and/or write data with respect to magnetic tape guided across said magnetic tape head;
a guiding system comprising only at least one single flange tape guide roller having a cylindrical surface oriented to provide a tape path for said magnetic tape across said at least one magnetic tape head, and having a single flange at one end of said cylindrical surface that is oriented with respect to said cartridge receiver to correspond to said second edge of said magnetic tape, eliminating guidance contact with respect to said first edge of said magnetic tape; and
a tape drive system configured to move said magnetic tape longitudinally along said tape path.

2. The magnetic tape drive of claim 1, wherein said guiding system comprises only at least one said single flange tape guide roller at either side of said at least one magnetic tape head along said tape path, eliminating guidance contact with respect to said first edge of said magnetic tape.

3. The magnetic tape drive of claim 2, wherein said tape drive system is configured to respectively wind and unwind magnetic tape longitudinally along said tape path to and from reels at either side of said at least one magnetic tape head, and wherein said single flange tape guide rollers are positioned at points along said tape path where said tape path is directed towards said reels.

4. A tape guiding system configured to guide a magnetic tape along a tape path, said tape path extending across at least one magnetic tape head from a magnetic tape cartridge oriented in a single direction, said magnetic tape cartridge having a length of magnetic tape with respectively first and second parallel edges at opposite sides of said magnetic tape, said second edge tending to create lower debris under contact than said first edge; said tape guiding system comprising:
only at least one single flange tape guide roller having a cylindrical surface oriented to provide a tape path for said magnetic tape across said at least one magnetic tape head, and having a single flange at one end of said cylindrical surface that is oriented with respect to said cartridge receiver to correspond to said second edge of said magnetic tape, eliminating guidance contact with respect to said first edge of said magnetic tape.

5. The tape guiding system of claim 4, wherein said tape path extends beyond said at least one magnetic tape head longitudinally on both sides of said at least one magnetic tape head; and
said tape guiding system comprises only at least one said single flange tape guide roller at either side of said at least one magnetic tape head along said tape path, eliminating guidance contact with respect to said first edge of said magnetic tape.

6. The tape guiding system of claim 5, wherein said tape path extends longitudinally to points at either side of said magnetic tape head where said magnetic tape is respectively directed toward reels, said reels configured to wind and unwind magnetic tape longitudinally along said tape path; and wherein said single flange tape guide rollers are positioned at points along said tape path where said tape path is directed towards said reels.

7. A magnetic tape recording path configured to record data with respect to a magnetic tape guided longitudinally along a tape path, said tape path extending from a magnetic tape cartridge oriented in a single direction, said magnetic tape cartridge having a length of magnetic tape with respectively first and second parallel edges at opposite sides of said magnetic tape, said second edge tending to create lower debris under contact than said first edge; said magnetic tape recording path comprising:
at least one magnetic tape head configured to read and/or write data with respect to magnetic tape guided across said magnetic tape head; and
a guiding system comprising only at least one single flange tape guide roller having a cylindrical surface oriented to provide a tape path for said magnetic tape longitudinally across said at least one magnetic tape head, and having a single flange at one end of said cylindrical surface that is oriented with respect to said cartridge receiver to correspond to said second edge of said magnetic tape, eliminating guidance contact with respect to said first edge of said magnetic tape.

8. The magnetic tape recording path of claim 7, wherein said guiding system comprises only at least one said single flange tape guide roller at either side of said at least one magnetic tape head along said tape path, eliminating guidance contact with respect to said first edge of said magnetic tape.

9. The magnetic tape recording path of claim 8, wherein said tape path extends longitudinally to points at either side of said magnetic tape head where said magnetic tape is respectively directed toward reels, said reels configured to wind and unwind magnetic tape longitudinally along said tape path; and wherein said single flange tape guide rollers are positioned at points along said tape path where said tape path is directed towards said reels.

* * * * *